(12) United States Patent
Sulzbach et al.

(10) Patent No.: US 6,809,124 B2
(45) Date of Patent: Oct. 26, 2004

(54) METHOD FOR THE PRODUCTION BLOCK FOAM

(75) Inventors: Hans-Michael Sulzbach, Königswinter (DE); Reiner Raffel, Siegburg (DE); Martin Schamberg, Hennef (DE)

(73) Assignee: Hennecke GmbH, Leverkusen (DE)

( * ) Notice: Subject to any disclaimer, the term of this patent is extended or adjusted under 35 U.S.C. 154(b) by 42 days.

(21) Appl. No.: 10/311,394

(22) PCT Filed: Jun. 8, 2001

(86) PCT No.: PCT/EP01/06524

§ 371 (c)(1),
(2), (4) Date: Dec. 13, 2002

(87) PCT Pub. No.: WO01/98389

PCT Pub. Date: Dec. 27, 2001

(65) Prior Publication Data

US 2003/0144368 A1 Jul. 31, 2003

(30) Foreign Application Priority Data

Jun. 21, 2000 (DE) .......................... 100 30 384

(51) Int. Cl.$^7$ .............................................. C08G 18/00
(52) U.S. Cl. ...................... 521/130; 425/4 R; 425/4 C; 425/190; 422/133; 422/135; 422/228; 262/DIG. 26; 366/182.1; 521/79; 521/170
(58) Field of Search ................................. 521/130, 170, 521/79; 425/4 R, 4 C, 190; 422/133, 135, 228; 261/DIG. 26; 366/182.1

(56) References Cited

U.S. PATENT DOCUMENTS

| | | | |
|---|---|---|---|
| 5,789,457 A | 8/1998 | Eiben et al. ................. 521/130 |
| 5,840,778 A | 11/1998 | Althausen et al. ............ 521/99 |
| 5,883,143 A | 3/1999 | Eiben et al. ................. 521/130 |
| 6,005,014 A | * 12/1999 | Blackwell et al. ............ 521/79 |
| 6,241,220 B1 | * 6/2001 | Blackwell et al. ............ 261/38 |
| 6,544,481 B1 | * 4/2003 | Sulzbach et al. ........... 422/133 |

FOREIGN PATENT DOCUMENTS

| | | |
|---|---|---|
| DE | 44 25 317 | 1/1996 |
| WO | 96/02376 | 2/1996 |

* cited by examiner

*Primary Examiner*—John M. Cooney
(74) *Attorney, Agent, or Firm*—Joseph C. Gil; Lyndanne M. Whalen

(57) ABSTRACT

The invention relates to a method for the production of polyurethane block foam, wherein a polyurethane reactive mixture containing carbon dioxide is suddenly relieved from a pressure above the pressure breaking the equilibrium of the carbon dioxide to a normal pressure, wherein the liquid polyurethane reactive mixture is foamed by releasing dissolved carbon dioxide. The foamed mixture is placed on a substrate and then hardened into block foam, wherein the carbon dioxide or at least one of the components polyol and isocyanate is initially dissolved in the reactive mixture at a pressure that is substantially above the pressure breaking the equilibrium, the pressure is subsequently lowered to a pressure close to the pressure breaking the equilibrium, wherein the pressure falls below the pressure breaking the equilibrium by releasing small amounts of carbon dioxide and forming a microdispersion of bubbles, the components are optionally mixed and a sudden pressure drop to normal pressure occurs before the carbon dioxide released is completely dissolved.

18 Claims, 5 Drawing Sheets

Fig. 5b  B - B

METHOD FOR THE PRODUCTION BLOCK FOAM

BACKGROUND OF THE INVENTION

The present invention relates to a process for the production of polyurethane block foam using carbon dioxide as blowing agent.

In such processes, preferably liquid carbon dioxide is mixed under pressure with preferably one of the components, especially the polyol component, and then the component containing dissolved carbon dioxide is introduced into a mixing chamber, where it is mixed with the other component, typically the isocyanate component, and additional auxiliary substances. To produce a uniform foam, the pressure of the polyol/isocyanate mixture containing dissolved carbon dioxide has to be reduced suddenly to normal pressure so that a large number of bubble nuclei are formed in the mixture as uniformly as possible and grow into uniform foam bubbles. The resulting liquid foam is transferred to a conveyor belt, where it may continue to foam due to the presence of additional blowing agents, and also cures. A particularly suitable additional blowing agent is water, which forms carbon dioxide by reaction with the isocyanate.

In accordance with a number of proposals made by the Applicant (EP-A 767 728, EP-A 777 564 and EP-A 794 857), the expansion is effected by forcing the polyol/polyisocyanate mixture containing carbon dioxide through a series of several interconnected screens or perforated plates having a large number of apertures with diameters in the order of 100 $\mu$m. Such perforated plates typically have several tens of thousands of drilled holes or through-holes. Because the screens or perforated plates are arranged in close proximity to one another, the expansion takes place within very short periods of time and each of the several tens of thousands of streams of polyol/polyisocyanate mixture passing through the perforated plate experiences high shear rates, generating a high and uniform bubble nucleus density of several hundred thousand bubble nuclei per cm$^3$ in the mixture. The supersaturation of the mixture produced by pressure reduction results in the generation of a corresponding number of very uniform foam bubbles. The number of perforated plates to be used, the size of the through-holes and the total free cross-section of the perforated plates are chosen as a function of the foam quality to be produced (carbon dioxide content of the mixture, foam density, pressure before expansion). There is only a limited possibility of varying the foam quality while the operation is running, i.e. without changing the perforated plates. Furthermore, because of the small diameter of the screen holes, there is a risk that they may become clogged over prolonged operating periods by fine solid particles present in the polyol/isocyanate mixture.

The production of filled foams remains an unsolved problem. Even very finely divided fillers with typical particle sizes of 10 $\mu$m block the screens due to the tendency of the filler particles to agglomerate.

The object of the present invention is to improve the bubble nucleation in the polyol/isocyanate mixture so that it is not necessary to use fine-pore screens, and also to allow the use of fillers in polyurethane foams produced with carbon dioxide as blowing agent.

One particular object of the invention is to provide a process for the production of polyurethane foams using carbon dioxide as blowing agent, wherein the pressure before expansion to normal pressure is minimal, i.e. wherein minimal demands can be made on the pressure-maintaining capacity of the foam-generating device (the perforated plates or screens according to the earlier proposals).

According to the earlier proposals mentioned above, bubble nucleation took place as the polyol/isocyanate mixture passed through the pressure-maintaining device. Bubble nucleation requires not only supersaturation of the mixture with carbon dioxide (i.e. the prevailing pressure is below the equilibrium solution pressure) but also the production of high shear rates. These high shear rates occur only in the marginal region of the apertures in the pressure-maintaining device. To generate a sufficiently large number of homogeneous bubble nuclei, it was therefore necessary either to choose very narrow apertures, for example with diameters of 50 $\mu$m or less, or to impose high shear rates on the mixture several times intermittently by designing the pressure-maintaining device as a pack of several perforated plates. Thus a high-quality foam can be produced with a stack of 5 to 7 screens whose holes have diameters of 100 to 120 $\mu$m. However, neither very small screen hole diameters nor a large number of stacked screens favour the concomitant use of fillers in the polyol/isocyanate mixture. With a number of stacked screens commensurate with the residence time of the mixture in the pressure-maintaining device, attempts to use perforated plates with hole diameters of about 200 $\mu$m have regularly led to foam qualities which can no longer be utilized commercially under modem conditions.

DESCRIPTION OF THE INVENTION

It has been found that a sufficient number of bubble nuclei can be generated in polyol containing dissolved carbon dioxide if the polyol undergoes a sufficiently large pressure drop on passing through a nozzle. The number of bubble nuclei formed depends on the pressure drop on passage through the nozzle. A sufficient number of bubble nuclei for polyurethane foam production are generated if the pressure drop on passage through the nozzle corresponds to at least 5 times the equilibrium solution pressure of the dissolved carbon dioxide. The basic experiments have been carried out on polyol. The same applies to isocyanate and the polyol/isocyanate mixture.

By exploiting these observations, it is possible to disassociate the bubble nucleation from the expansion to normal pressure.

The present invention accordingly provides a process for the production of polyurethane block foam, wherein a polyurethane reactive mixture containing carbon dioxide is suddenly expanded from a pressure above the equilibrium solution pressure of the carbon dioxide to normal pressure, the liquid polyurethane reactive mixture foams with the release of dissolved carbon dioxide, and the foamed mixture is applied to a substrate and then cured to form block foam, characterized in that the carbon dioxide is initially completely dissolved in the reactive mixture, or in at least one of the components polyol and isocyanate, at a pressure substantially above the equilibrium solution pressure, the pressure is then reduced to a value close to the equilibrium solution pressure, falling in the meantime below the equilibrium solution pressure with the release of small amounts of carbon dioxide to form a bubble microdispersion, the component containing carbon dioxide is mixed with the other component, if appropriate, and the pressure is suddenly reduced to normal pressure without the released carbon dioxide being completely redissolved.

The magnitude of the pressure substantially above the equilibrium solution pressure before the first pressure reduction determines the number of bubble nuclei generated during the first pressure reduction. To produce a uniform small-cell block foam, it is necessary, depending on the proportion of dissolved $CO_2$, to generate about 100,000 to 200,000 bubble nuclei per $cm^3$ of liquid polyol/polyisocyanate mixture. This is generally the case when the pressure before the first pressure reduction is more than 5 times the equilibrium solution pressure of the dissolved carbon dioxide. The pressure before the first pressure reduction should preferably be between 8 and 15 times the equilibrium solution pressure of the dissolved carbon dioxide. Apart from the technological difficulties of pressure control, there is no upper limit to the pressure: the higher the pressure, the smaller the cells in the resulting block foam.

In principle, the first pressure reduction can be carried out after the polyol, isocyanate and carbon dioxide have been mixed, although the unit for mixing the polyol and isocyanate then has to be operated at high pressure.

Therefore, the carbon dioxide is preferably dissolved in the polyol component at high pressure and the polyol component containing carbon dioxide is introduced under reducing pressure into the mixing chamber in order to be mixed with the isocyanate. The pressure reduction can be effected by passage through a simple pressure-reducing valve, preferably in the form of an adjustable needle valve. Because of the high speed of passage through the valve, the pressure of the polyol/carbon dioxide mixture is momentarily reduced below the equilibrium solution pressure, bubble nuclei being generated by the high shear rates simultaneously produced.

The pressure in the mixing chamber is kept close to the equilibrium solution pressure of the carbon dioxide in the polyol/isocyanate mixture. As the polyol containing carbon dioxide is mixed with the isocyanate, the carbon dioxide concentration is reduced by the mixing in the ratio of the mixing components. Until it mixes with the isocyanate, the polyol containing carbon dioxide, injected into the mixing chamber, is at a pressure below the equilibrium solution pressure of carbon dioxide in isocyanate for a sufficient time to form stable bubble nuclei. In other words it is supersaturated with carbon dioxide. The typical period required to form stable bubble nuclei, i.e. bubble nuclei whose diameter is sufficient for the surface tension to prevent their tendency to redissolve, is $10^{-4}$ to $10^{-2}$ sec.

If the first pressure reduction takes place after the polyol and isocyanate have been mixed, care must be taken to ensure that the pressure is below the equilibrium solution pressure for a sufficient length of time. This can be achieved with appropriately designed Laval nozzles.

After the first expansion the pressure should be as close as possible to the equilibrium solution pressure of the dissolved carbon dioxide in the polyol/isocyanate mixture, i.e. not sufficiently above the equilibrium solution pressure to allow the bubble nuclei to redissolve and not sufficiently below the equilibrium solution pressure to allow the bubble nuclei to grow to bubble sizes that tend to coagulate.

Preferably, the equilibrium solution pressure should be exceeded by less than a pressure difference $\Delta p$ of $0.5/t$ bar, where t is the time in seconds that elapses between the first and second pressure reductions. The time required between the first pressure reduction and the second pressure reduction is determined by the volume of apparatus (mixing chamber and pipelines) between the first and second pressure-reducing devices and the throughput of polyol/polyisocyanate mixture. This time is typically 0.5 to 6 seconds, preferably 2 to 4 seconds.

The amount by which the pressure falls below the equilibrium solution pressure between the first and second pressure reductions should preferably be less than 5%, particularly preferably less than 3% and very particularly preferably less than 2% of the equilibrium solution pressure. In this case the bubble nucleus diameters remain well below 100 $\mu$m, even when an equilibrium is adjusted, so that there is substantially no coagulation of bubble nuclei.

Accordingly, for a polyol/isocyanate mixture which contains 4 parts by weight of carbon dioxide to 100 parts by weight of polyol and whose equilibrium solution pressure is about 5 bar, the pressure should typically be less than 0.1 bar above or below the equilibrium solution pressure. Variations arise from the different solubility of carbon dioxide in different qualities of raw materials and from specific apparatus conditions.

Accordingly, an essential feature of the present invention is sensitive adjustment and maintenance of the pressure of the polyol/isocyanate mixture between the first and second pressure reductions. This can be achieved in a number of ways: One possibility consists in maintaining the equilibrium solution pressure via the pressure-reducing device for the first pressure reduction. Another possibility is to adjust the mass fluxes of the components so that, for given apparatus conditions, the equilibrium solution pressure is assured between the first and second pressure reductions. The equilibrium solution pressure is preferably assured by using a pressure-reducing device of variable pressure-maintaining capacity for the second pressure reduction.

The invention also provides a pressure-maintaining device for the foaming of polyol/polyisocyanate mixtures containing carbon dioxide dissolved under pressure, and optionally containing fillers, said device comprising, at a housing outlet transverse to the direction of flow of the mixture, two parallel perforated plates whose separation is adjustable between 0.1 and 0.3 mm and which have the following features:

- the perforated plates have a uniform perforation grid of constant pitch,
- the two grids being offset by half a period relative to one another,
- the hole density of the downstream perforated plate is 1.5 and 5 per $cm^2$,
- the free cross-sectional area of the upstream perforated plate is between 1.5 and 4%, based on the total cross-section of the perforated plates, and
- the free cross-sectional area of the downstream perforated plate is between 10 and
- 30%, based on the total cross-section of the perforated plates.

The pressure-maintaining device is preferably formed of two perforated plates, each of which has a trilateral or quadrilateral perforation grid.

Also, the pressure-maintaining device is preferably formed of an upstream perforated plate with a hexagonal perforation grid and a downstream perforated plate with a triangular grid, the hole density of the upstream perforated plate therefore being twice that of the downstream perforated plate. "Upstream" and "downstream" relate to the separation gap between the perforated plates.

Particularly preferably, the through-holes in the downstream perforated plate are conically enlarged in the direction of flow, especially in such a way that the outlet of the perforated plate, i.e. the underside of the plate, is formed of sharp edges so that no voids are formed in the flow.

The invention is illustrated in greater detail below with the aid of the Figures.

FIG. 1 diagrammatically shows a device for carrying out the process according to the invention.

Figure 1:
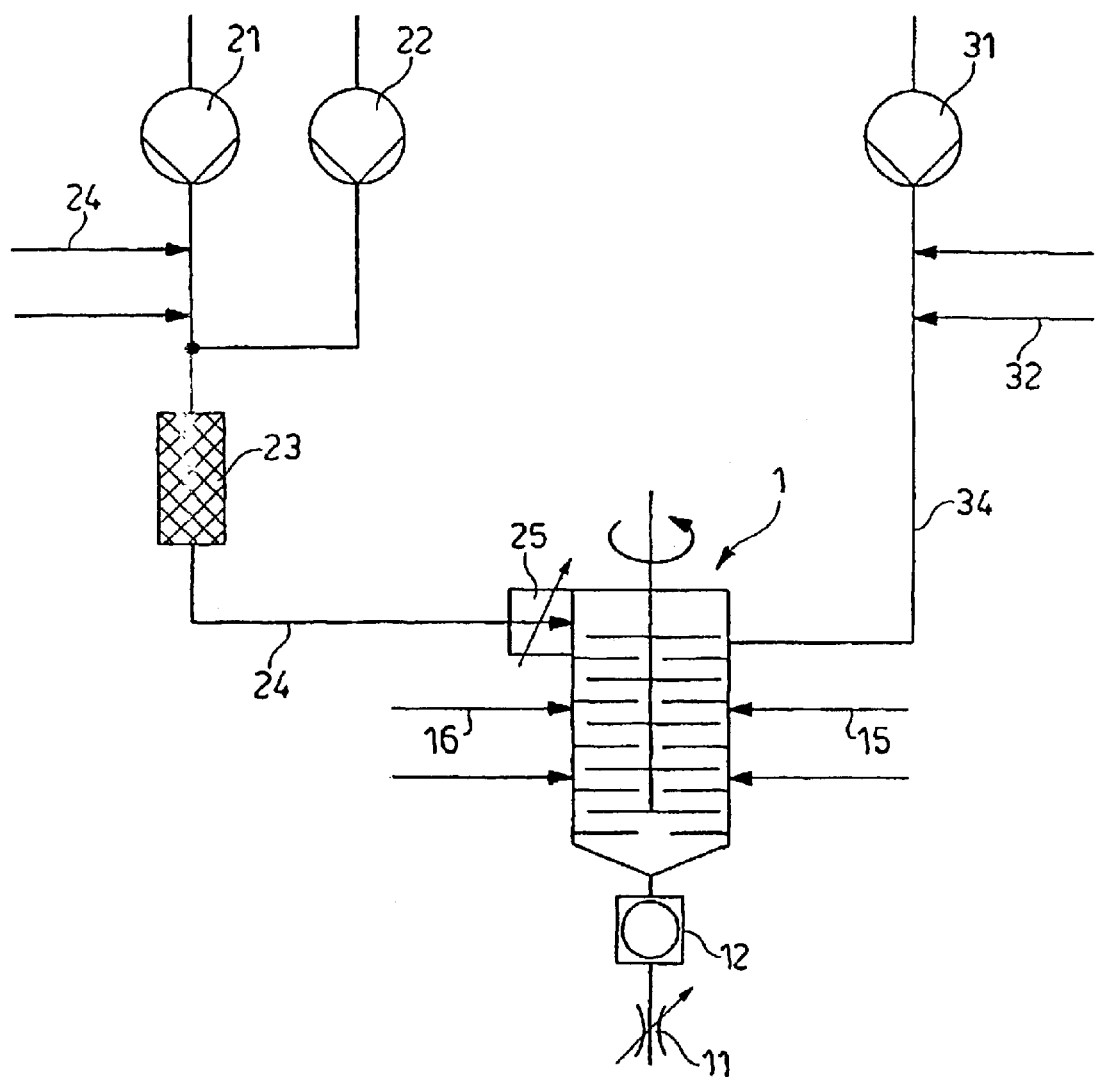

FIG. 1 shows a mixing unit 1 for mixing polyol and isocyanate, represented by way of example in the form of a pin mixer. Polyol containing dissolved carbon dioxide is fed into one side of the mixing unit via the line 24. The polyol is at a pressure of at least 5 times the equilibrium solution pressure of the dissolved carbon dioxide, for example at a pressure of 30 to 150 bar. The polyol is introduced into the mixing unit under reducing pressure via the pressure-reducing valve 25.

The carbon dioxide can be dissolved in the polyol e.g. in a static mixer 23 into which polyol and liquid carbon dioxide are fed via the pumps 21 and 22. The polyol can contain finely divided fillers such as, for example, melamine resins. Additives such as, for example, foam stabilizers can be fed into the polyol via the line 24. Isocyanate is introduced into the mixing unit 1 via the line 34 by means of the pump 31. Other additives can also be introduced into the mixing chamber via the lines 15 and 16. The polyol/isocyanate mixture containing carbon dioxide, obtained after mixing, is then expanded to atmospheric pressure through the second pressure-maintaining device 11, which assures the pressure in the mixing unit 11. According to the invention, the latter should be approximately the same as the equilibrium solution pressure of the carbon dioxide in the polyol/isocyanate mixture, fed in via the line 24. For pressure regulation, a pressure gauge can be provided at the outlet of the mixing unit or in the pressure-maintaining device 11 so that the pressure-reducing valve 25 or the second pressure-maintaining device 11 (when an adjustable second pressure-maintaining device is used) be regulated as a function of the prevailing pressure. As an alternative or addition to pressure regulation, it is also possible to provide an inspection glass 12 between the mixing unit 1 and the second pressure-maintaining device 11 to allow observation of the polyol/isocyanate mixture. The latter should preferably be slightly turbid due to small foam bubbles, which are preferably formed by less than 2% of the dissolved carbon dioxide. The inspection glass 12 preferably consists of two parallel glass plates with the polyol/isocyanate mixture containing carbon dioxide flowing between them. It is illuminated on one side and the scattered light can be measured on the other side by a photoelectric detector and the measuring signal used to control the pressure-maintaining devices 25 and/or 11.

Figure 2:
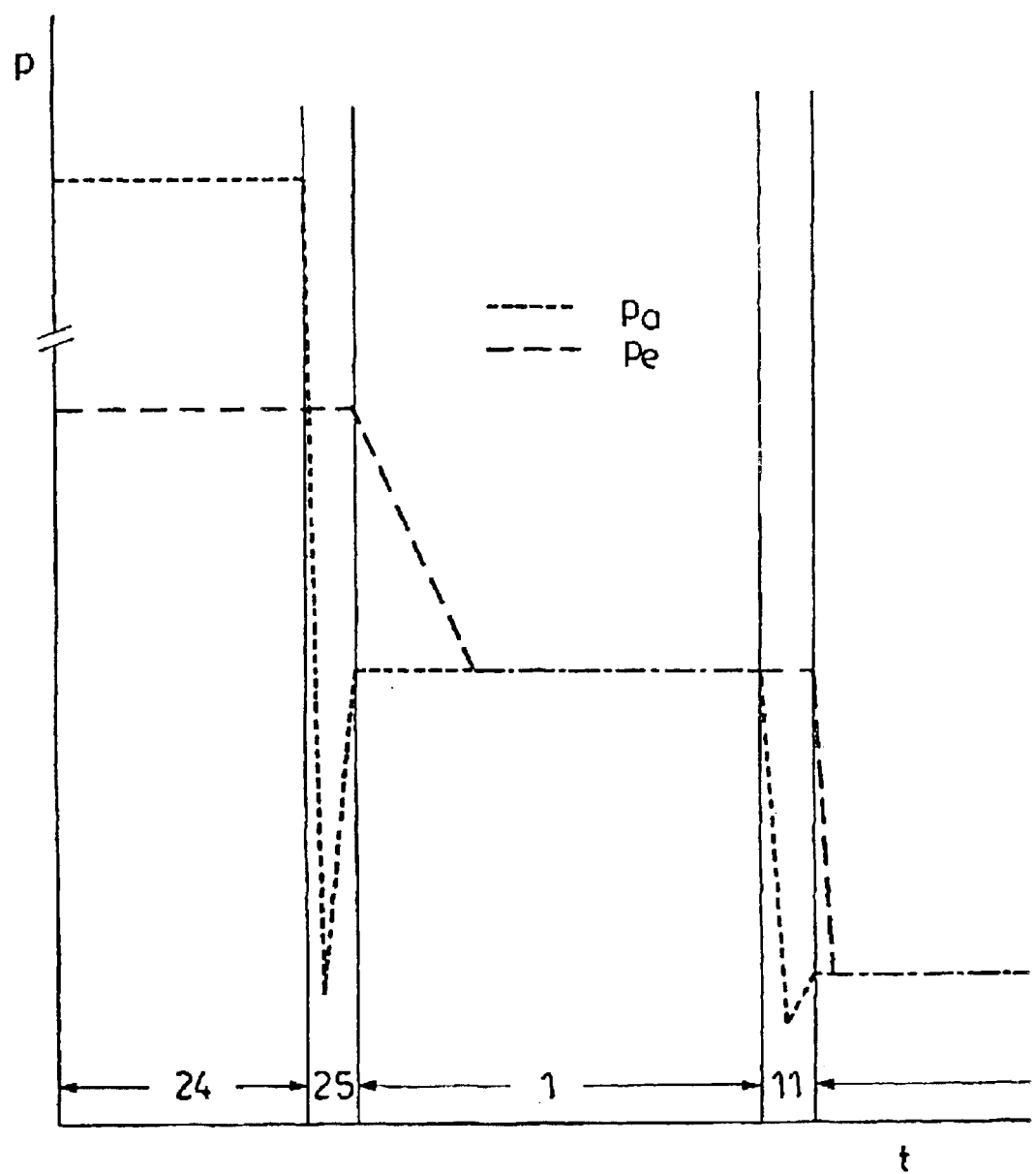
FIG. 2 is a basic illustration of the pressure and concentration relationships during the operation of the process according to the invention.

FIG. 2 qualitatively illustrates the pressure change on passage through the device according to the invention. The dotted line indicates the current pressure Pa in the various parts of the device (reference numerals as in FIG. 1). The dashed line indicates the equilibrium solution pressure Pe for the dissolved carbon dioxide. The current pressure prevailing in the line 24 is at least 5 times the equilibrium solution pressure. The polyol containing carbon dioxide is injected into the mixing chamber 1 from the line 24 via the pressure-reducing device 25. Because of the high speed of passage through the nozzle 25, the pressure is momentarily reduced well below the equilibrium solution pressure, generating a large number of bubble nuclei. According to the invention, the current pressure inside the mixing chamber 1 should be approximately the same as the equilibrium solution pressure, which, depending on the dilution of the carbon dioxide on mixing with the isocyanate, is lower than the equilibrium solution pressure in the line 24 by a factor of about 1.5 to 1.8. Because the polyol containing carbon dioxide has not yet been mixed with the isocyanate when it enters the mixing unit, the equilibrium solution pressure is above the current pressure up to the point of mixing, so that bubble nuclei generated in the nozzle 25 can initially grow until their diameter exceeds e.g. 10 $\mu$m. On passage through the second expansion device 11, the current pressure momentarily falls sharply because of the speed of flow and reaches atmospheric pressure after passage through the pressure-maintaining device 11, the bulk of the still dissolved carbon dioxide being released. It is an essential feature of the invention that the pressure prevailing in the mixing chamber 1 is approximately the same as the equilibrium solution pressure of the dissolved carbon dioxide in the polyol/isocyanate mixture. Any pressure in excess of the equilibrium solution pressure should not be so large as to allow the bubble nuclei generated in the pressure-reducing valve 25 to redissolve before the mixture passes through the pressure-maintaining device 11; on the other hand, the current pressure should preferably not be so far below the equilibrium solution pressure as to allow more than 2% of the dissolved carbon dioxide to be released.

Figure 3:
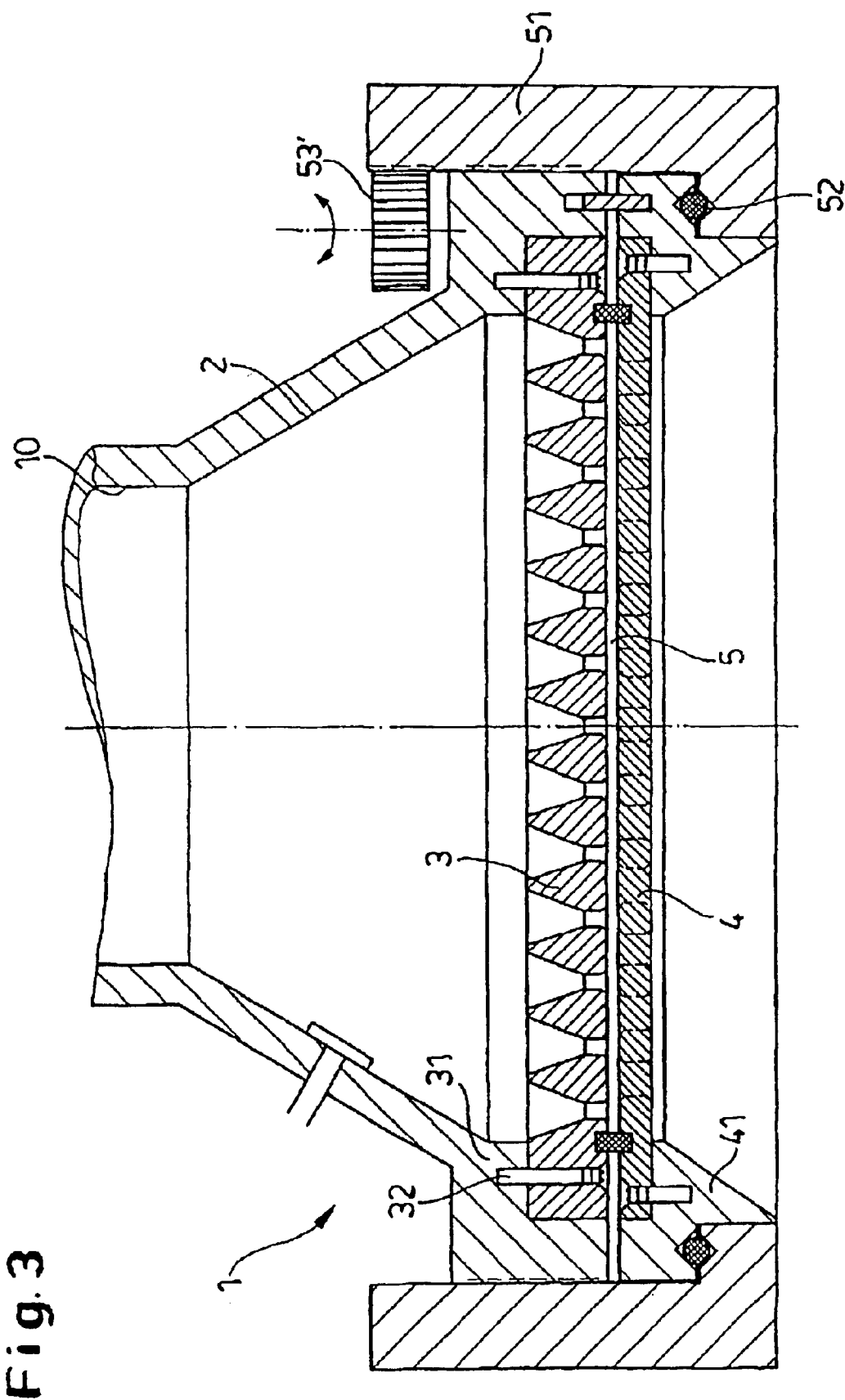
FIG. 3 shows the second pressure-reducing device which can be used according to the invention.

FIG. 3 shows a pressure-maintaining device with adjustable pressure-maintaining capacity that can preferably be used according to the invention. It consists of a housing 2 connected to the inlet line 10 coming from the mixing unit. Arranged in the housing 2 are an upper perforated plate 3 and a lower perforated plate 4 with an adjustable gap 5 between them. The cross-section of flow from the drilled holes in the perforated plate 3 to the drilled holes in the perforated plate 4, and hence the pressure-maintaining capacity, are changed by adjusting the height of the gap 5. Those skilled in the art are familiar with a large number of possible ways in which the height of the gap 5 can be changed. In the illustration shown by way of example, the upper perforated plate 3 is fixed to the housing section 31 liquid-tight by the screws 32. The lower perforated plate 4 is fixed to the retaining ring 41 by the screws 42. The retaining ring 41 is secured by the flange 51, which is screwed to the housing 2. By virtue of the ball bearing or roller bearing 52, the flange 51 can be rotated against the retaining ring 41, thereby changing the height of the gap 5. This can be done by means of an electric drive 53 engaging with the flange 51.

Figure 4A:
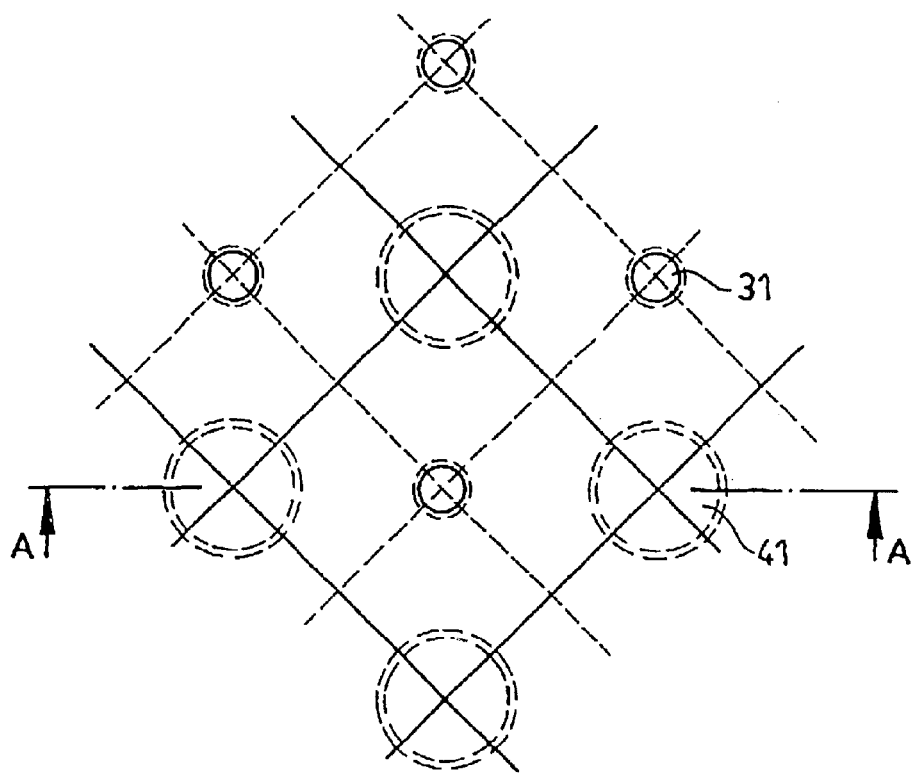
FIG. 4 shows a preferred embodiment of the second pressure-reducing device in detail.
Figure 4B:
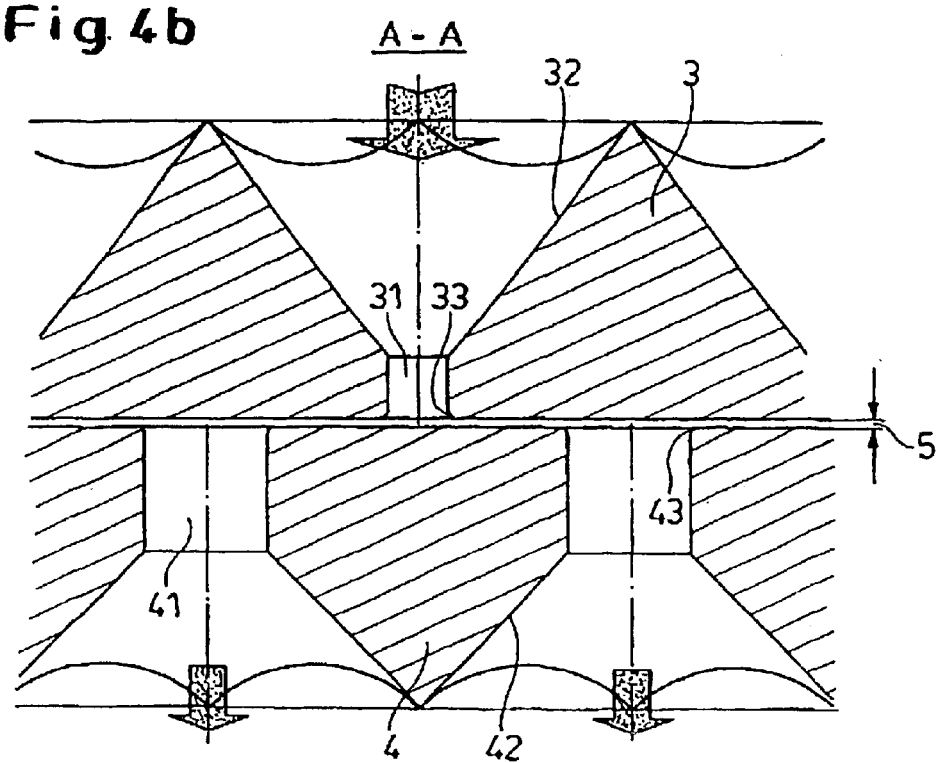

FIG. 4 shows in greater detail a portion of the perforated plates 3 and 4 of FIG. 3. FIG. 4a is a top view of the perforated plates in the axial direction and FIG. 4b shows a section A—A through FIG. 4a. The upper and lower perforated plates 3 and 4 each have drilled holes 31 and 41, respectively, arranged in a uniform grid, the two perforation grids being offset by half a period. The square grid shown is preferred. The hole density of the two grids should be about 1.5 to 4 holes per $cm^2$. The open cross-sectional area of the upper perforated plate 3, i.e. the free cross-section of all the holes 31, is preferably 1.5 to 4% of the total area of the perforated plate. The free area of passage of the lower perforated plate, i.e. the sum of the holes 41, is preferably 12 to 30%, based on the total cross-section of the perforated plates. The height of the gap 5 between the perforated plates is preferably adjustable between 0.1 and 0.3 mm.

The holes 41 are preferably drilled with a conical shape towards the side where the polyol/isocyanate/carbon dioxide mixture emerges, particularly preferably with an overlapping conical shape such that no voids can form in the flow underneath the plate.

Also, on their sides adjacent to the gap 5, the holes 31 and 41 preferably have bevelled edges 33 and 43, respectively, to favour the inflow or outflow of the polyol/isocyanate/carbon dioxide mixture.

Typically, the throughput of polyol/isocyanate/carbon dioxide mixture through the perforated plates, or the size of the perforated plates relative to a given throughput, can be chosen so that the speed of passage through the holes 41 in the lower perforated plate 4 is between 1 and 3 m/sec.

Figure 5A:
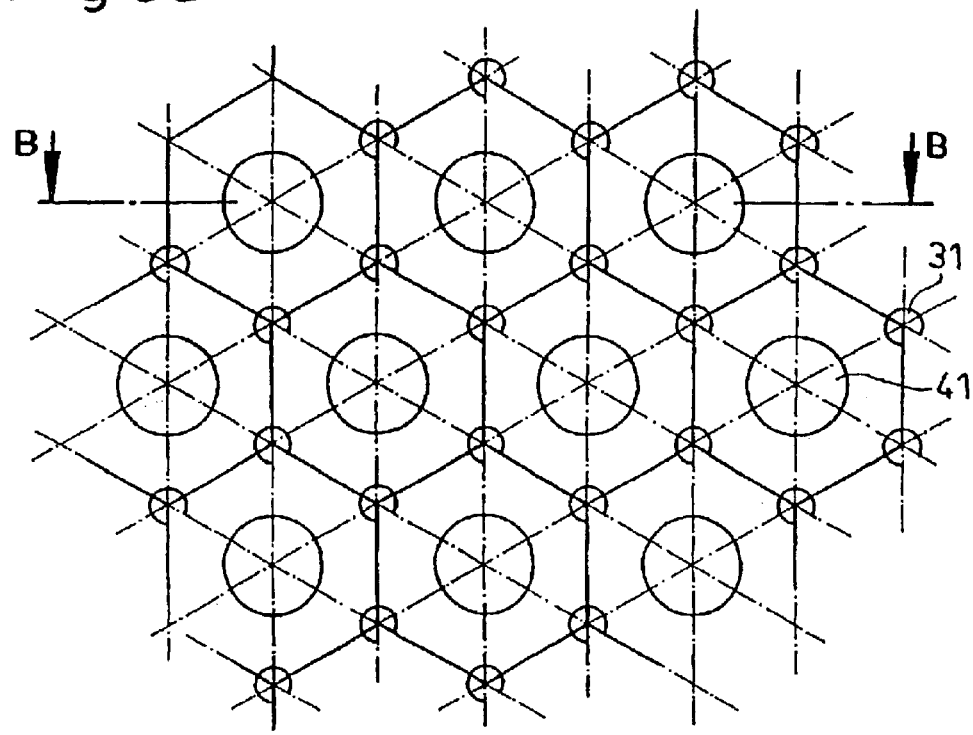
Figure 5A:
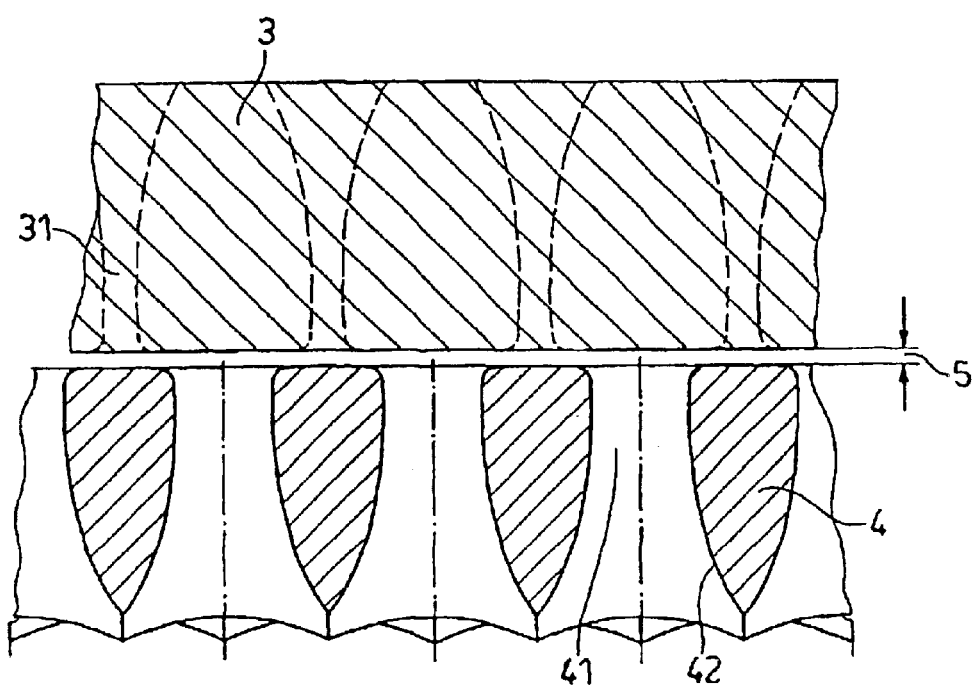

FIG. 5 shows another preferred embodiment of the perforated plates of the adjustable pressure-maintaining device according to the invention. The upper perforated plate 3 has a uniform hexagonal perforation grid with holes 31. The lower perforated plate 4 has a uniform trilateral perforation grid of the same period with holes 41.

The two perforated plates are arranged in such a way that the perforation grids are offset by half a period relative to one another, whereby each outflow hole 41 is surrounded by 6 inflow holes 31 at the gap 5. This achieves a more uniform flow against the outflow hole 41 in the gap 5.

What is claimed is:

1. In a process for the production of polyurethane block foam, comprising a) suddenly expanding a polyurethane reactive mixture containing carbon dioxide from a pressure above the equilibrium solution pressure of the carbon dioxide to normal pressure, the liquid polyurethane reactive mixture foams with the release of dissolved carbon dioxide, b) applying the foamed mixture to a substrate and c) curing the foamed mixture to form block foam, the improvement wherein i) the carbon dioxide is initially completely dissolved in the reactive mixture, or in at least one of the components, either polyol and isocyanate, at a first pressure substantially above the equilibrium solution pressure, ii) the pressure is then reduced to a value close to the equilibrium solution pressure, falling in the meantime below the equilibrium solution pressure with the release of small amounts of carbon dioxide to form a bubble microdispersion, iii) the components are mixed, if necessary, and iv) the pressure is suddenly reduced to normal pressure before the released carbon dioxide is completely redissolved.

2. The process of claim 1, wherein the first pressure is substantially more than 5 times the equilibrium solution pressure.

3. The process of claim 1, wherein in step ii), the pressure reduction from substantially above the equilibrium solution pressure to a value close to the equilibrium solution pressure is effected by means of a nozzle to produce a high speed of flow and a high shear rate.

4. The process of claim 3, wherein the nozzle is designed in the form of an adjustable annular slotted nozzle (needle valve).

5. The process of claim 1, wherein the carbon dioxide is dissolved in the polyol component under high pressure, the polyol component is injected into a mixing unit for mixing with the isocyanate component, the pressure being reduced to a value close to the equilibrium solution pressure in the reactive mixture, and the reactive mixture is expanded to normal pressure after leaving the mixing unit.

6. The process of claim 1, wherein the time between the first pressure reduction (step ii)) and the second pressure reduction (step iv)) is 0.3 to 6 seconds.

7. The process of claim 1, wherein characterized in that the pressure close to the equilibrium solution pressure exceeds the latter by less than a value $\Delta p$ of 0.5/t bar, where t is the time in seconds between the first (step ii)) and second (step iv) pressure reductions.

8. The process of claim 1, wherein the pressure close to the equilibrium solution pressure falls below the latter by less than 5%.

9. The process of claim 1, wherein the pressure is measured and regulated before the second pressure reduction (step iv)).

10. The process of claim 9, wherein the pressure is regulated before the second reduction by adjusting the mass flows of the components.

11. The process of claim 9, wherein the pressure reduction to normal pressure is effected in a pressure-maintaining device with adjustable pressure-maintaining capacity (based on a constant mass flow) and the pressure is regulated before the second pressure reduction by adjusting the pressure-maintaining capacity of the pressure-maintaining device.

12. The process of claim 1, wherein the reactive mixture contains finely divided fillers.

13. A pressure-maintaining device for the foaming of polyol/polyisocyanate mixtures containing carbon dioxide dissolved under pressure, and optionally containing fillers, said device comprising, at a housing outlet transverse to the direction of flow of the mixture, two parallel perforated plates whose separation is adjustable between 0.1 and 0.3 mm and which have the following features:
  a) the perforated plates have a uniform perforation grid of constant pitch,
  b) the two grids are offset by half a period relative to one another,
  c) the hole density of the downstream perforated plate is between 1.5 and 5 per $cm^2$.
  d) the free cross-sectional area of the upstream perforated plate is between 1.5 and 4%, based on the total cross-section of the perforated plates, and
  e) the free cross-sectional area of the downstream perforated plate is between 10 and 30%, based on the total cross-section of the perforated plates.

14. The pressure-maintaining device of claim 13, wherein the through-holes in the perforated plates have beveled edges towards the separation gap.

15. The pressure-maintaining device of claim 14, wherein the edge beveling of the upstream perforated plate corresponds to a radius of curvature of 0.2 to 0.5 mm.

16. The pressure-maintaining device of claim 13, wherein the holes in the downstream perforated plate are enlarged with an overlapping conical shape on the pressure-free side.

17. The pressure-maintaining device of claim 13, wherein the two perforated plates both have either a trilateral or a quadrilateral perforation grid.

18. The pressure-maintaining device according of claim 13, wherein the upstream perforated plate has a hexagonal perforation grid and the downstream perforated plate has a triangular perforation grid.

* * * * *